US005115689A

United States Patent [19]

Isozumi et al.

[11] Patent Number: 5,115,689

[45] Date of Patent: May 26, 1992

[54] STARTER UNIT

[75] Inventors: Shuzou Isozumi; Keiichi Konishi, both of Hyogo, Japan

[73] Assignee: Mitsubishi Denki K.K., Tokyo, Japan

[21] Appl. No.: 658,715

[22] Filed: Feb. 21, 1991

[30] Foreign Application Priority Data

Mar. 13, 1990 [JP] Japan .................................... 2-63054

[51] Int. Cl.[5] ......................... F02N 15/06; F16D 3/34

[52] U.S. Cl. ........................................ 74/7 C; 74/7 E; 192/45

[58] Field of Search .................... 74/7 E, 7 C; 192/42, 192/45, 48.3; 290/38 C, 48; 475/331

[56] References Cited

U.S. PATENT DOCUMENTS 3,584,713 6/1971 Tani et al. ......................... 192/45 X
3,904,005 9/1975 Husmann ............................. 192/45
4,800,766 1/1989 Isozumi et al. ....................... 74/7 E
4,891,996 1/1990 Isozumi et al. .................... 74/7 E X
4,924,108 5/1990 Isozumi ................................ 290/48
4,945,777 8/1990 Isozumi ................................ 74/7 E

*Primary Examiner*—Allan D. Herrmann
*Assistant Examiner*—David W. Laub
*Attorney, Agent, or Firm*—Sughrue, Mion, Zinn, Macpeak & Seas

[57] ABSTRACT

In a starter unit with an planetary gear speed reducer, the outer cylindrical surface of a cylindrical portion which is axially protruded from the carrier in the speed reducer, and the inner cylindrical surface of a radially extended wall portion of the clutch outer are engaged with each other in such a manner that they are slidable with each other with a predetermined rotation torque, and the end portion of the cylindrical portion is engaged with an axially extended cut formed in the outer cylindrical surface of the end portion of the clutch inner with a small clearance, whereby the engagement region of the carrier and the clutch outer can be increased in area, thus being able to positively and accurately cut the transmission of power attributing only to impact load.

2 Claims, 2 Drawing Sheets

STARTER UNIT

BACKGROUND OF THE INVENTION

1. Field of the Invention

This invention relates to starter units, and more particularly to a starter unit which is used to start the engine of a vehicle, having a rotary output shaft which is driven by an electric motor and is movable axially.

2. Description of the Prior Art

A typical example of a conventional starter unit having a rotary output shaft which is axially movable is a so-called coaxial starter unit which is as shown in FIG. 2.

The conventional coaxial starter unit, as shown in FIG. 2, includes a DC motor which has a yoke 1 forming a magnetic circuit and serving as an outer wall of the starter unit, permanent magnets 2 arranged on the inner surface of the yoke 1 at equal angular intervals, an armature 3 rotatably mounted along the central axis of the yoke 1, and a commutator (not shown) provided at one end of the armature 3.

In the DC motor 4, the armature 3 is made up of a hollow rotary shaft 5, and an armature core 6 mounted on the armature rotary shaft 5. A rotary output shaft 7 is provided on one side of the DC motor 4 (on the right side in FIG. 2) in such a manner that it is in alignment with the armature rotary shaft 5. The rotation is transmitted with the aid of a drive force transmitting device 8. The drive force transmitting device 8 has: a planetary gear speed reducer 9, over-running clutch 10 and a helical spline **7*a* formed on the rotary output shaft 7 in such a manner that it is engaged with a second helical spline 10*d* which is formed in the inner cylindrical wall of the clutch inner component 10*a* of the over-running clutch 10. The hollow rotary shaft 5 of the armature has an internal passageway 5*a* formed in it in such a manner that it is extended along its axis. One end portion of the output shaft 7 is in alignment with the armature rotary shaft 5 and is inserted into the internal passageway 5*a*** together with a metal sleeve in such a manner that the output shaft is axially slidable through the metal sleeve.

The torque of the armature rotary shaft 5 is transmitted to the output shaft 7 through the planetary gear speed reducer 9 and the over-running clutch 10. The speed reducer 9 has: a sun gear **9*a* which is integral with the front end portion of the armature rotary shaft 5, an internal gear 9*b* formed around the sun gear 9*a*, and a plurality of planetary gears 9*c* which are engaged with the sun gear 9*a* and the internal gear 9*b*, and are rotatably supported by supporting shafts 9*c* which are secured to the clutch outer component 10*b* of the over-running clutch 10. The clutch inner component 10 of the over-running clutch 10 is engaged with the helical spline 7*a* which is formed in the outer cylindrical wall of the large diameter portion 7*b* of the output shaft 7. Therefore, the output shaft 7 is slid axially by the torque applied thereto through the clutch component inner 10*a*. As the output shaft 7 is slid in this manner, a pinion 11 mounted on the front end portion of the output shaft 7 are protruded from an outer front bracket 12 (not illustrated) to engage with the ring gear (not shown) of the engine to rotate it. In FIG. 2, reference character 10*c* designates rollers interposed between the clutch outer component 10*b* and the clutch inner component 10*a*. The aforementioned internal gear 9*b* is formed in a gear forming member 13, which serves as an inner front bracket and is coupled to the yoke 1 with through-bolts 14. The through-bolts 14 are further used to mount an electromagnetic switch 15 is mounted on the rear end of the DC motor 4. The electromagnetic switch 15 is used to slide the output shaft 7 axially, and is employed to supply current from the battery to the DC motor 4** when the vehicle's key switch is turned on.

The conventional coaxial starter unit thus constructed suffers from the following difficulties. If the starting operation is carried out during inertial rotation of the engine, then excessively an large load is applied to the power transmitting system, especially to the ring gear, so that the pinion 11 and other components may be damaged.

When such an abnormally large impact is made on the power transmitting system, damage may be prevented by a method in which the carrier of the planetary gear speed reducer and the clutch outer component of the over-running clutch are engaged with each other in such a manner that they slide with a predetermined rotation torque. However, in this case, the engagement must serve as a so-called "torque limiter" which positively and accurately cuts the transmission of power attributing to the impact load only. For this purpose, it is necessary to set a relatively high transmission torque for the slide surface of the carrier and clutch outer thus engaged.

SUMMARY OF THE INVENTION

Accordingly, an object of this invention is to eliminate the above-described difficulties accompanying a conventional starter unit.

More specifically, an object of the invention is to provide a starter unit having a so-called "torque limiter" which, when an excessively large load occurs during a starting operation, accurately and positively cuts the transmission of power attributed to the impact load only.

The foregoing object and other objects of the invention have been achieved by the provision of a starter unit having a rotary output shaft which is rotated by an electric motor and is axially movable, which, has: a pinion provided at the front end of the output shaft so as to be engaged with the ring gear of an engine, and planetary gear speed reducer for reducing the speed of rotation of the electric motor. The planetary gear speed reducer has a carrier which supports a plurality of planetary gears, and an over-running clutch engaged with the output shaft to transmit the rotation of the electric motor, the speed of which speed has been reduced by the planetary gear speed reducer to the output shaft. The over-running clutch includes a clutch inner component spline-engaged with the output shaft, and a clutch outer component disposed through a number of rollers outside the clutch inner component. The carrier has a cylindrical portion protruded axially whose outer cylindrical surface is engaged with the inner cylindrical surface of a radially extended wall portion of the clutch outer component in such a manner as to be slidable with a predetermined rotation torque. The end portion of the cylindrical portion, which is engaged with the radially extended wall, being engaged with an axially extended cut formed in the outer cylindrical surface of the end portion of the clutch inner with a small clearance.

When, in the starter unit of the subject invention, an excessively large load is applied to the power transmitting system, the outer cylindrical surface of the cylindrical portion of the carrier and the inner cylindrical surface of the radially extended wall portion of the clutch outer component are slid with respect to each other, thus absorbing the impact stress. Furthermore, the end portion of the carrier, which is engaged with the radially extended portion of the clutch outer components in the above-described manner, is engaged with the axially extended cut formed in the outer cylindrical wall of the end portion of the clutch inner component with the small clearance. Therefore, the engagement region of the carrier and the clutch outer component can be increased in area, whereby a relatively high transmission torque can be set to the engagement region. Thus, the engagement region can positively and accurately cut the transmission of power attributed only to the impact load.

The nature, principle and utility of the invention will become more apparent from the following detailed description when read in conjunction with the accompanying drawings.

DETAILED DESCRIPTION OF THE PREFERRED EMBODIMENT

Figure 1:
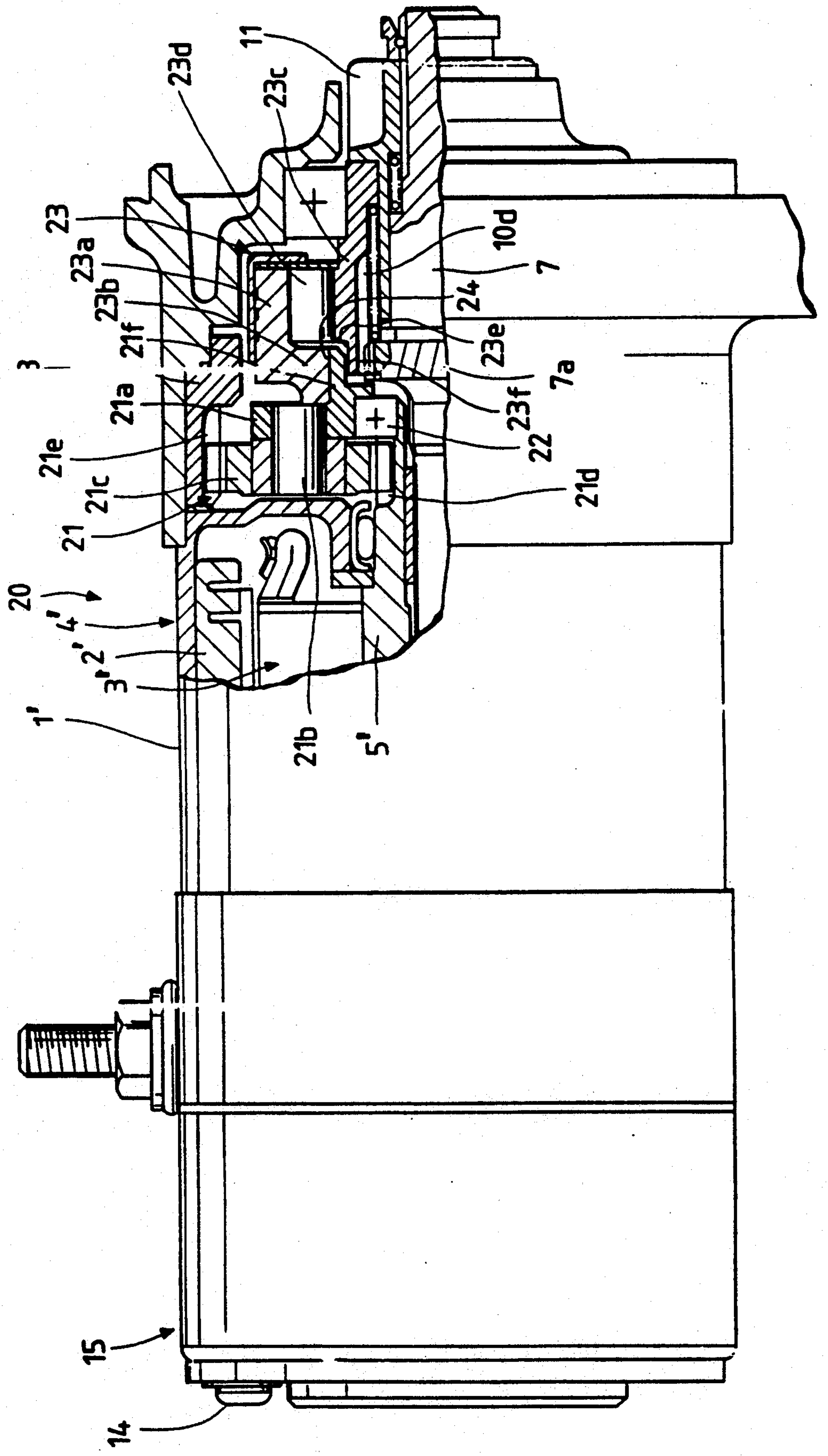
FIG. 1 is a sectional view showing a coaxial starter unit according to this invention.
Figure 2:
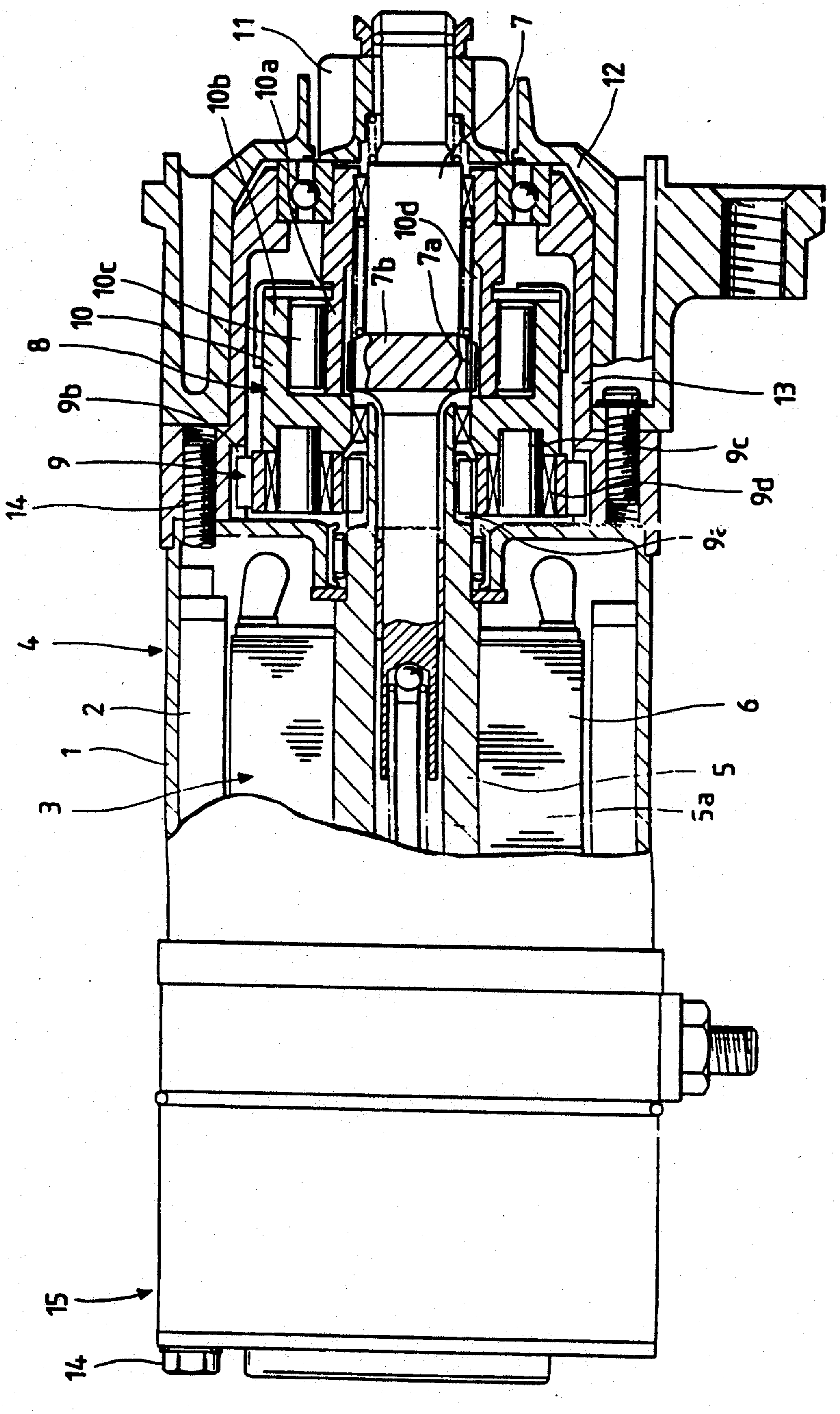
FIG. 2 PRIOR ART
FIG. 2 is a sectional view showing a conventional coaxial starter unit.

One preferred embodiment of this invention, a starter unit, will be described with reference to FIG. 1, The starter unit of the preferred embodiment is generally indicated at 20 in FIG. 1, and is of coaxial type, similarly as in the above-described conventional starter unit shown in FIG. 2. The coaxial start unit 20 includes a planetary gear speed reducer 21 which has a plurality of planetary gears which are rotatably supported through supporting shafts 21*b* by a carrier 21*a*. The planetary gears 21*c* are engaged with a sun gear 21*d* formed on the front end portion of the armature rotary shaft 5 and with an internal gear 21*e* formed in the inner cylindrical wall of the gear forming member 13 serving as the inner front bracket, much like the conventional coaxial starter unit shown in FIG. 2. Thus, the planetary gears 21 are each revolved around the sun gear 21*d* while being rotated. The carrier 21*a* is supported by a bearing 22 which is mounted on the front end portion of the armature rotary shaft 5, and its central portion is formed into a cylindrical portion 21*f* which is protruded axially. The inner cylindrical surface, of a radially extended wall portion 23*b*, which forms the clutch outer component 23*a* of an over-running clutch 23, is engaged with the outer cylindrical surface of the cylindrical portion 21*f* of the carrier 21 in such a manner that it slides with a predetermined rotation torque. The over-running clutch 23 is fundamentally equal in structure to the over-running clutch in the above-described conventional coaxial starter unit; that is, it essentially comprises a clutch inner component 23*c*, and cylindrical rollers 23*d*. The starter of the preferred embodiment also has yoke 1', magnets 2', armature 3', and D.C. motor 4'. These components function similarly to like components found in conventional starters.

As was described above, the cylindrical portion 21*f* of the carrier 21*a* is slidably engaged with the clutch outer 23*a* of the over-running clutch 23. This engagement can lessen the abnormal impact which may occur when an excessively large load is applied during operation of the starter. However, this is not sufficient. That is, the engagement region (indicated at 24 in FIG. 1) must serve as a torque limiter which accurately and positively cuts the transmission of power attributing to impact load only. For this purpose, it is necessary to set a relatively high transmission torque for the slide surface of the engagement region 24, as was described before.

There are three methods of increasing the transmission torque at the engagement region. A first method is to increase the area of the slide surface, a second method is to increase the rigidity of each of the two members thus engaged, and a third method is to increase the interference.

In the first method, the area of the slide surface may be increased by increasing the diameter of the engagement region 24 or by increasing the slide surface in the axial direction. However, it is difficult to increase the diameter of the engagement region 24, because the supporting shafts 21*b* for mounting the planetary gears 21*c* on the carrier 21*a* are limited in position. It is also not recommendable to increase the slide surface in the axial direction, because the axial length of the starter unit is increased; i.e., the increase in axial length of the start is contrary to the demand for miniaturization.

In the case of the second method, it is possible to sufficiently increase the rigidity of the clutch outer component. However, it is difficult to sufficiently increase the rigidity of the carrier because the bearing and other components make portions part of the carrier thinner.

The third method also gives rise to another problem. The engagement of the clutch outer component and the carrier may be achieved by shrinkage fitting with the clutch outer component expanded by heat, or with the carrier cooled. However, if, in this case, the interference is increased, then it is necessary to increase the temperature for heating the clutch outer component, and therefore the surface hardness of the engagement region is decreased when tempered.

In order to overcome these difficulties, in the starter unit 20 of the preferred embodiment, the end portion of the cylindrical portion 21*f* of the carrier 21*a* forming the engagement region 24 is engaged with an axially extended cut 23*e* with a small clearance which cut is formed in the outer peripheral wall of the end portion of the clutch inner 23*c*. Hence, in this case, the rollers 23*d* of the over-running clutch 23 can be decreased in length, the radially extended wall portion 23*b* can be increased in thickness, and the axial length of the engagement region can be increased. That is, without increase of the length of the helical spline 10*d* formed in the inner cylindrical wall of the clutch inner component 23*c* or the axial length of the starter unit itself, a sufficiently long axial movement distance can be provided for the output shaft.

The fact that the end portion of the cylindrical portion 21*f* of the carrier 21*a* is engaged with the axially extended cut 23*e* formed in the outer peripheral wall of the clutch inner component 23 with the small clearance as was described above is equivalent to a sleeve 23*f* formed integrally at the end portion of the clutch inner component 23*c* is fitted in the cylindrical portion 21*f* of the carrier 21*a* with a small clearance. This fact can prevent the eccentric rotation of the clutch inner component 23 which is otherwise caused by the imbalance in weight which is given to the clutch inner component in a circumferential direction during manufacture.

In the above-described embodiment, the electromagnetic switch 15' is provided at the rear end of the starter motor; however, the invention is not limited thereto or thereby. That is, the technical concept of the invention is applicable to a starter unit in which the output shaft is moved forwardly with a shift lever.

As was described above, in the starter unit of the invention, the cylindrical portion of the carrier in the planetary gear speed reducer is engaged with the inner cylindrical surface of the radially extended wall of the clutch outer component in the over-running clutch in such a manner as to be slidable with a predetermined torque, and the end portion of the cylindrical portion, which is engaged with the radially extended wall in the above-described manner, is engaged with the axially extended cut formed in the outer cylindrical surface of the end portion of the clutch inner component with a small clearance. Hence, without increase of the axial length of the start unit itself, or increase in the axial length of the helical spline formed in the inner component cylindrical wall of the clutch inner that is, with the distance of movement of the output shaft maintained sufficiently long, the engagement region of the carrier and the clutch outer can be increased in area. Thus, a relatively high transmission torque can be set, so that, when excessively large load occurs with the starter unit during operation, the transmission of power attributed only to the impact load can be cut accurately and positively.

While the invention has been described in connection with the preferred embodiment, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A starter unit having a rotary output shaft which is rotated by an electric motor and is axially movable, which comprises:

a pinion provided at a front end of said output shaft so as to be engaged with a ring gear of an engine;

a planetary gear speed reducer for reducing the speed of rotation of said electric motor, said planetary gear speed reducer having a carrier which supports a plurality of planetary gears; and an over-running clutch engaged with the output shaft to transmit the rotation of said electric motor, the speed of which has been reduced by said planetary gear speed reducer, to the output shaft, said over-running clutch including a clutch inner component spline-engaged with the output shaft, and a clutch outer component operatively engaged with said clutch inner component by virtue of a plurality of rollers disposed therebetween;

said carrier having a cylindrical portion extending axially therefrom whose outer surface is engaged with an inner surface of a radially extended wall portion of said clutch outer component in such a manner as to be slidable relative to said wall portion with a predetermined rotation torque, an end portion of said cylindrical portion, being substantially engaged, at an inner surface substantially opposite said outer surface, with an axially extended portion formed in an outer surface of said clutch inner component.

2. A starter unit according to claim 1, wherein said cylindrical portion and said wall portion are engaged in a manner so that said predetermined rotation torque is set so as to accurately and positively cut the transmission of power attributing to impact load when excessively large load occurs with the starter unit during operation.

* * * * *